United States Patent [19]

Kwasnik et al.

[11] Patent Number: 5,121,963
[45] Date of Patent: Jun. 16, 1992

[54] RETAINER RING

[75] Inventors: Kenneth J. Kwasnik, Kalamazoo; David Harrell, Royal Oak, both of Mich.

[73] Assignee: Lear Seating Corporation, Southfield, Mich.

[21] Appl. No.: 743,114

[22] Filed: Aug. 9, 1991

Related U.S. Application Data

[63] Continuation-in-part of Ser. No. 592,250, Oct. 3, 1990, abandoned.

[51] Int. Cl.$^5$ .................................... A47C 31/02
[52] U.S. Cl. ................................... 297/218; 160/380; 297/227
[58] Field of Search ............... 297/218, 219, 226, 227, 297/194, 411, 441; 24/460, 461, 462; 40/603; 160/380, 391, 395, 398

[56] References Cited

U.S. PATENT DOCUMENTS

| 3,803,671 | 4/1974 | Stuppy et al. | 24/460 |
| 4,284,305 | 8/1981 | Porter et al. | 24/462 X |
| 4,370,002 | 1/1983 | Koepke | 297/226 |
| 4,836,609 | 6/1989 | Hill | 297/218 |
| 4,890,883 | 1/1990 | Boerema et al. | 297/218 X |
| 5,015,034 | 5/1991 | Kindig et al. | 297/218 X |

Primary Examiner—Kenneth J. Dorner
Assistant Examiner—J. Bonifanti
Attorney, Agent, or Firm—Reising, Ethington, Barnard, Perry & Milton

[57] ABSTRACT

An armrest storage assembly (20) disposed for use with a vehicle seat assembly (22) includes a lower tray (28) and a top closure member (30) generally referred to as substrates (28,30). Each substrate (28,30) includes an upper periphery forming a U-shaped channel (46). A fabric material (20) is wrapped about the substrate (28,30) having an edge (52) disposed within the U-shaped channel (46). The armrest assembly (20) further includes a U-shaped retainer ring (54) for interlocking disposition in the channel (46). The retainer ring (54) includes gripping members (72) for gripping the material (20) as the retainer ring (54) is forcibly inserted in the channel (46) and for retaining the material (20) in the U-shaped channel (46). The retainer ring (54) further includes coacting members (82,90) spaced laterally from the gripping members (72) and further spaced from the edge (52) of the material (50) and including a pair of longitudinal recesses (90) for interlocking engagement with a plurality of hooks (82) extending from the U-shaped channel (46) to retain the ring (54) and material (50) in the channel (46).

11 Claims, 5 Drawing Sheets

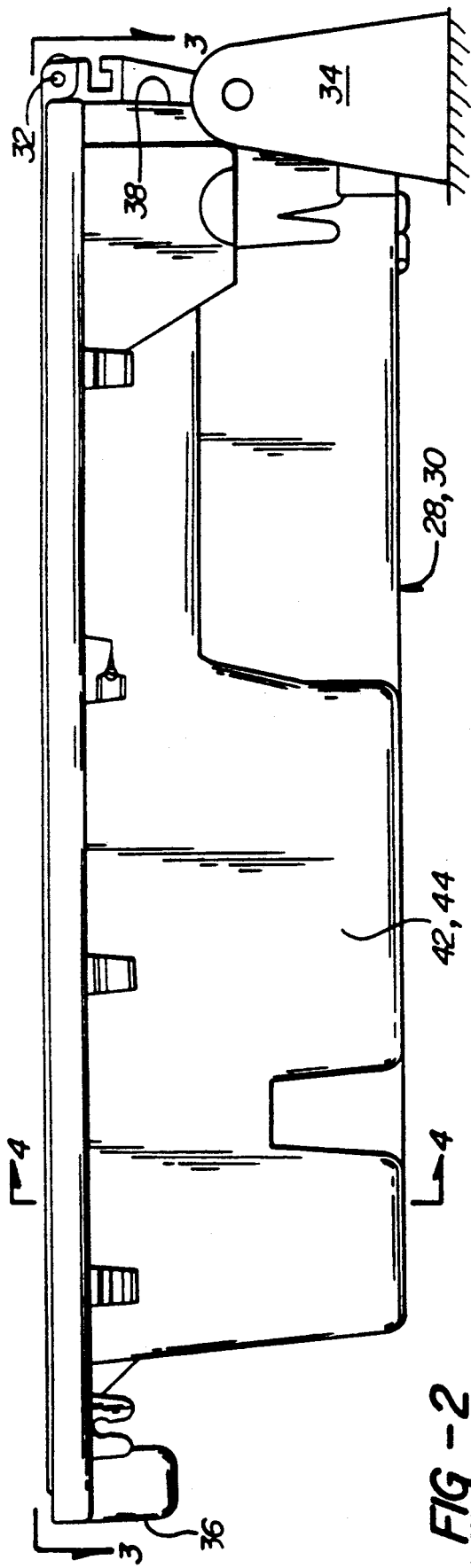
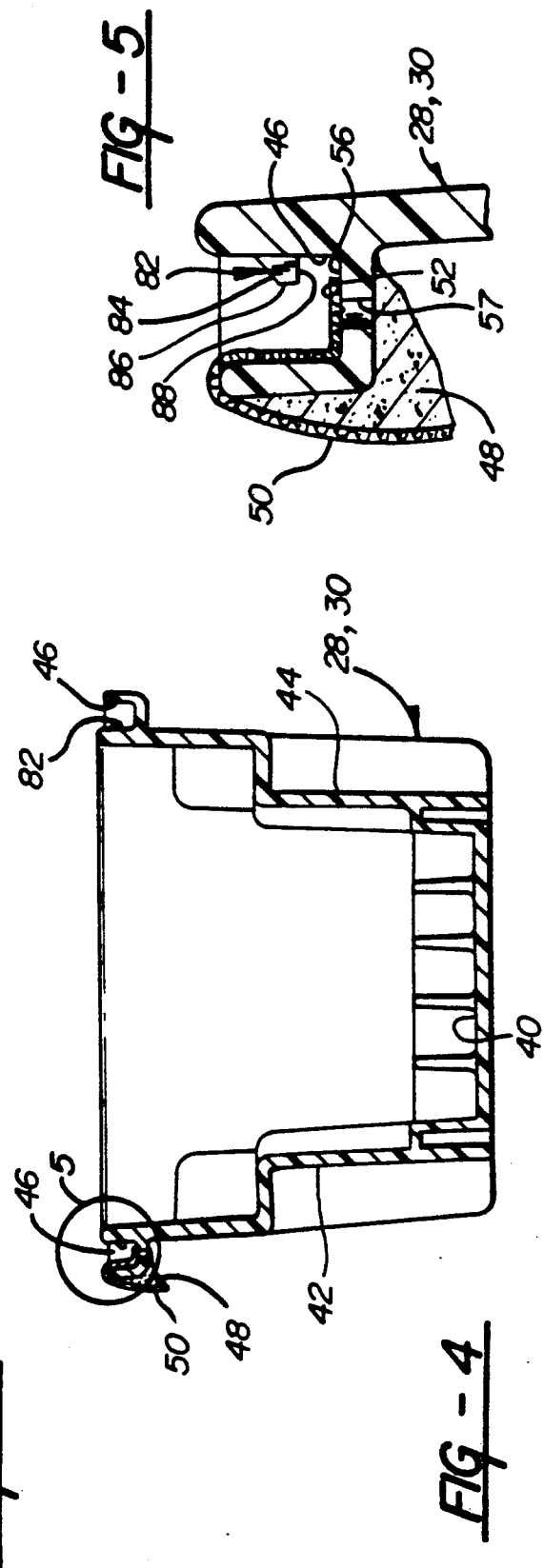

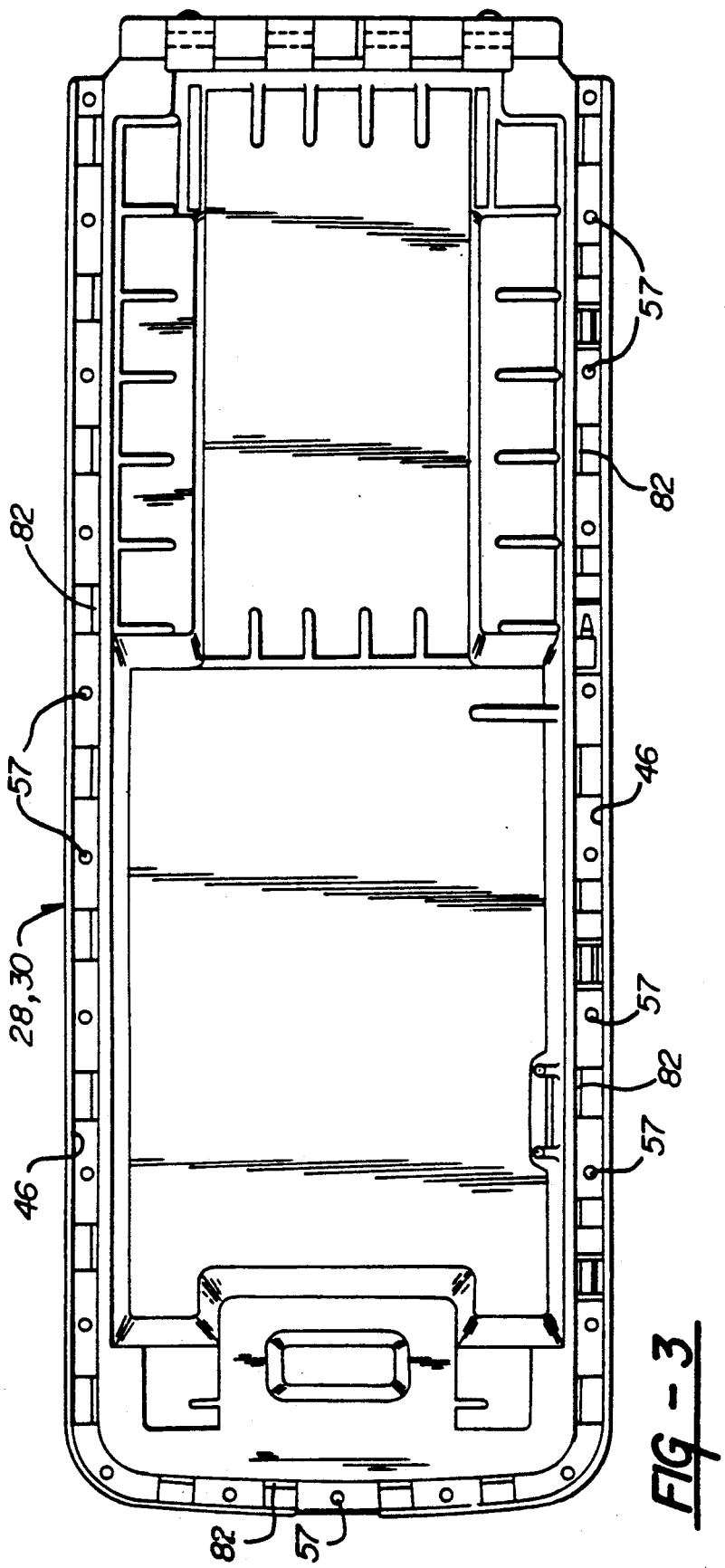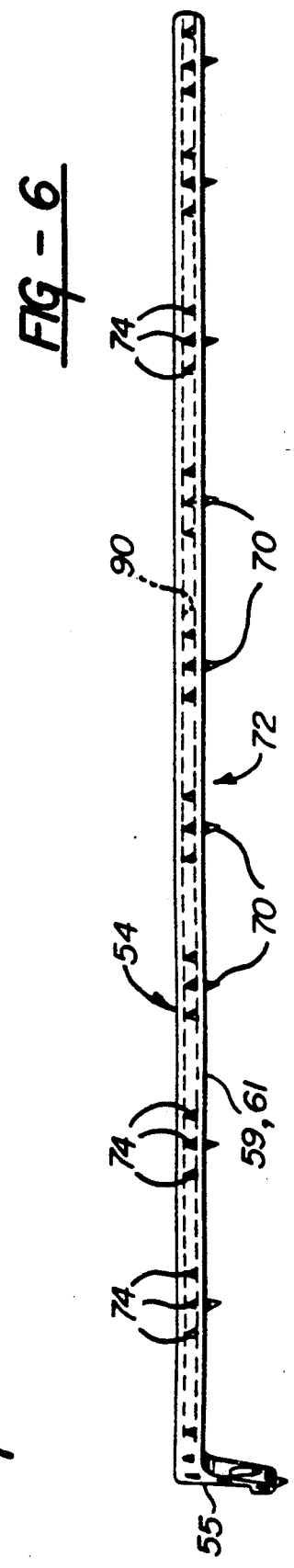

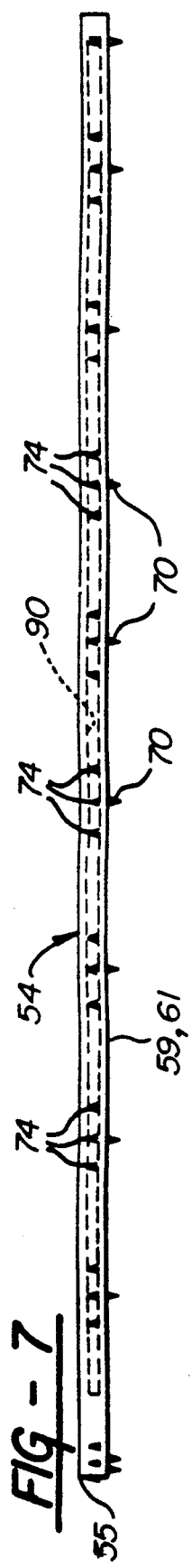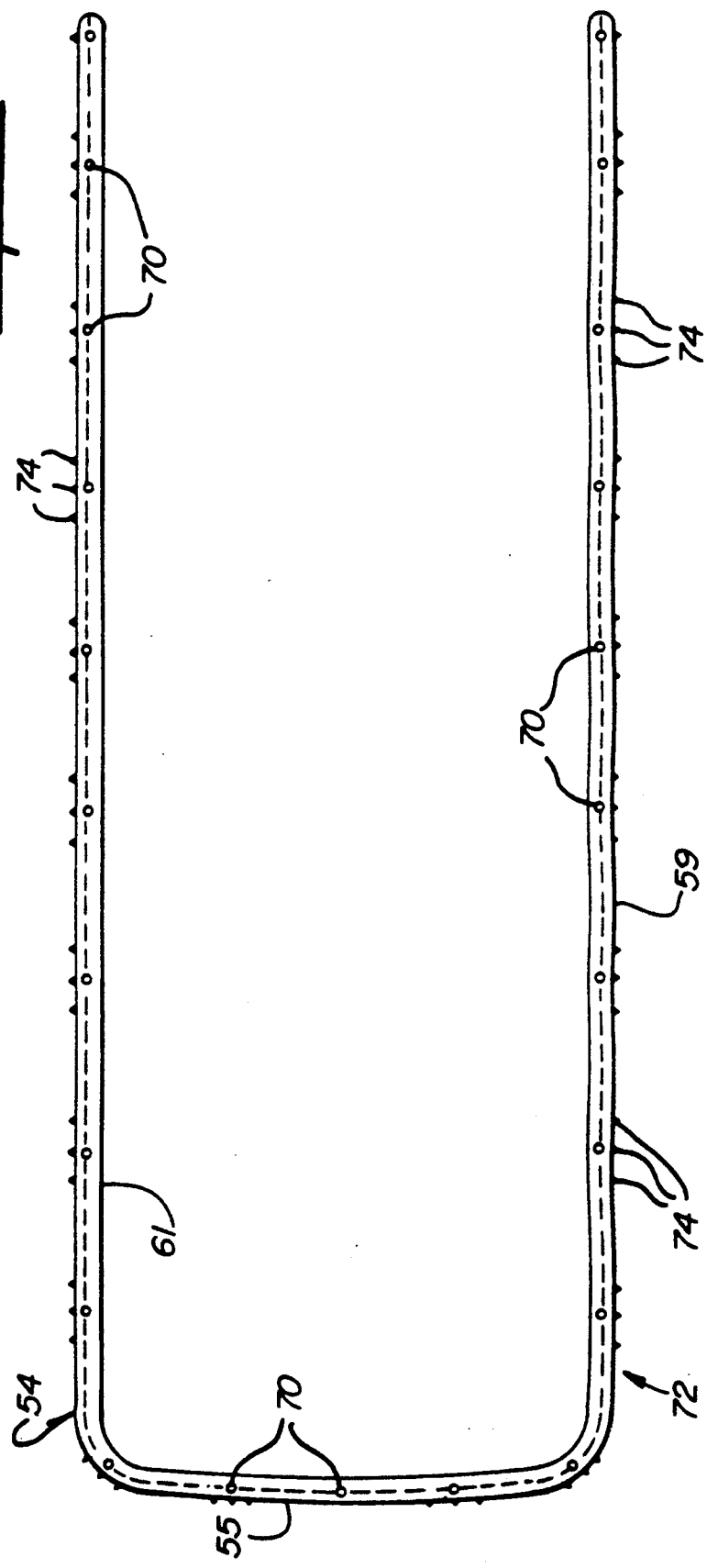

RETAINER RING

This is a continuation-in-part of copending application(s) Ser. No. 0/592,250 filed on Oct. 3, 1990, now abandoned.

TECHNICAL FIELD

The subject invention relates generally to an armrest storage assembly for use with a vehicle seat assembly, and more particularly, to an armrest storage assembly having means for retaining upholstering material about the vehicle armrest.

BACKGROUND OF THE INVENTION

Conventionally, automotive vehicles include an armrest storage assembly disposed for use with a vehicle seat assembly. The armrest assembly generally includes a lower tray providing a storage compartment and an upper closure member for covering the storage compartment and for providing a comfortable forearm rest to the vehicle passengers. The upper and lower members of the armrest assembly are often covered by a foam pad and an upholstery material covering to provide an aesthetic and comfortable armrest for prolonged use. The material covering is wrapped about each member independently and requires a retaining system for securing and retaining the covering about each member.

For example, U.S. Pat. No. 4,890,883 to Borema et al, issued Jan. 2, 1990, discloses an upholstery retaining system for a vehicle armrest including a substrate having a U-shaped channel and including alternately staggered apertures and slots in the floor of the U-shaped channel. A U-shaped trim member with corresponding alternately staggered pins and locking tabs are received in the apertures and slots respectively for compressively locking the trim member in the U-shaped channel and for retaining the upholstered material in the channel of the substrate.

Similarly, the U.S. Pat. No. 3,803,671 to Stuppy et al, issued Apr. 16, 1974, discloses a material retaining assembly comprising a base member having a channel for receiving a portion of a sheet-like material therein. A material retaining element is inserted into the channel for lockingly retaining the material in the channel. The retaining element includes means for retaining the element in the channel and further includes a plurality of gripping members spaced laterally from the retaining means on the opposite side of the retaining element for gripping and preventing the material from being pulled out of the channel.

SUMMARY OF THE INVENTION AND ADVANTAGES

In accordance with the present invention, there is provided an armrest storage assembly for a vehicle comprising; a substrate having a U-shaped channel, a flexible sheet-like material cover having an edge disposed within the channel, retainer means having an outside wall and a laterally spaced inside wall lockingly disposed in the channel for retaining the material in the channel, and gripping means disposed on the outside wall of the retainer means for gripping the material adjacent the edge and retaining the material in the U-shaped channel as the retainer means is forcibly inserted in the channel. The assembly is characterized by including coacting means interlocking the inside wall of the retainer means and the channel and spaced from the edge of the material for fixedly locking the retainer means into the channel while the edge remains spaced from the coacting means to prevent interference therewith while the coacting means locks the retainer means in the channel.

FIGURES IN THE DRAWINGS

FIG. 2 is a side elevational view of the container defining the armrest;

FIG. 3 is a top view taken substantially along line 3—3 of FIG. 2;

FIG. 4 is a cross-sectional view taken substantially along line 4—4 of FIG. 2;

FIG. 5 is an enlarged fragmentary cross-sectional view of the area in the circle in FIG. 4;

FIG. 6 is a side elevational view of the retainer ring for disposition in the lower container;

FIG. 7 is a side view of the retainer means for disposition in the upper cover member;

FIG. 8 is a top view of the retainer means of FIG. 7;

DESCRIPTION OF THE PREFERRED EMBODIMENT

Figure 1:
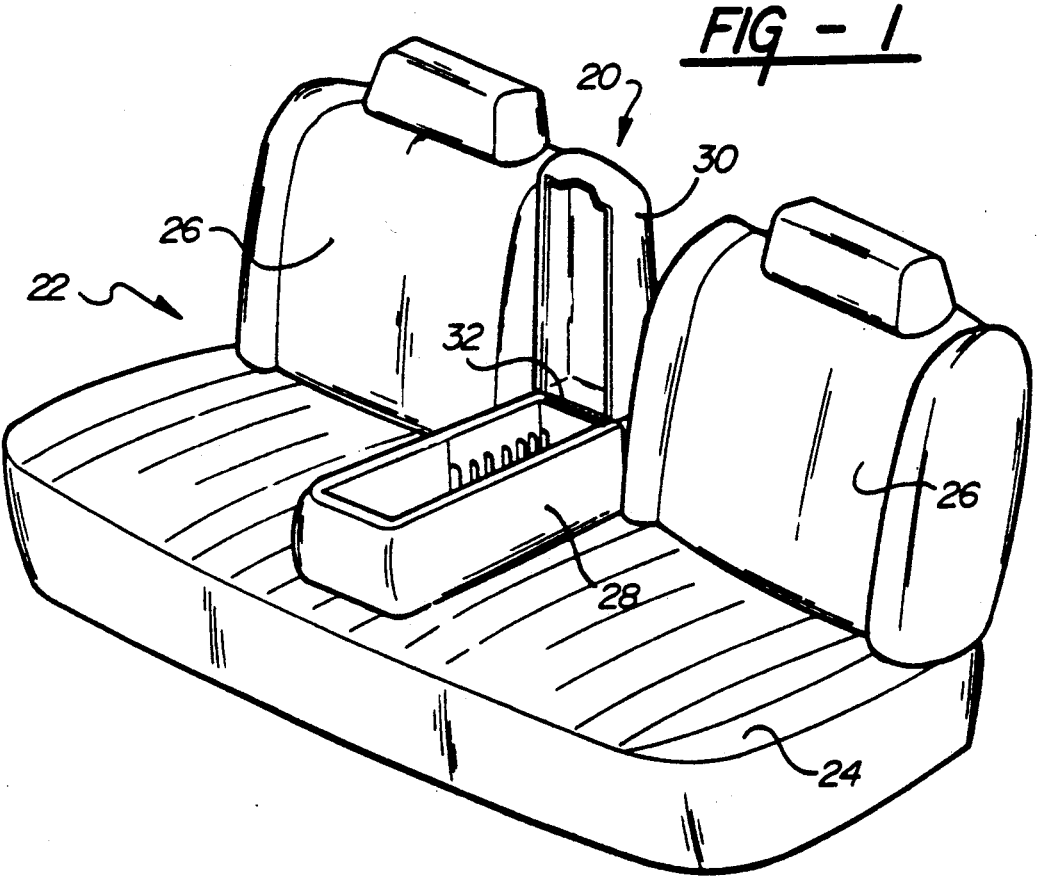
FIG. 1 is a perspective view of the vehicle seat assembly shown with the storage armrest assembly of the subject invention.
Figure 13:
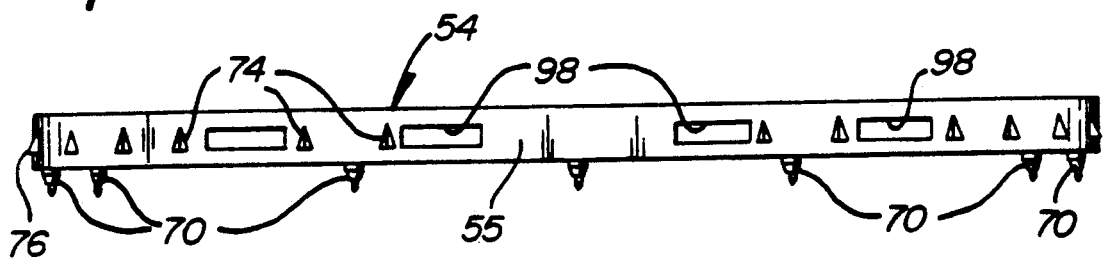
FIG. 13 is an end view of the lower retainer means.
Figure 12:
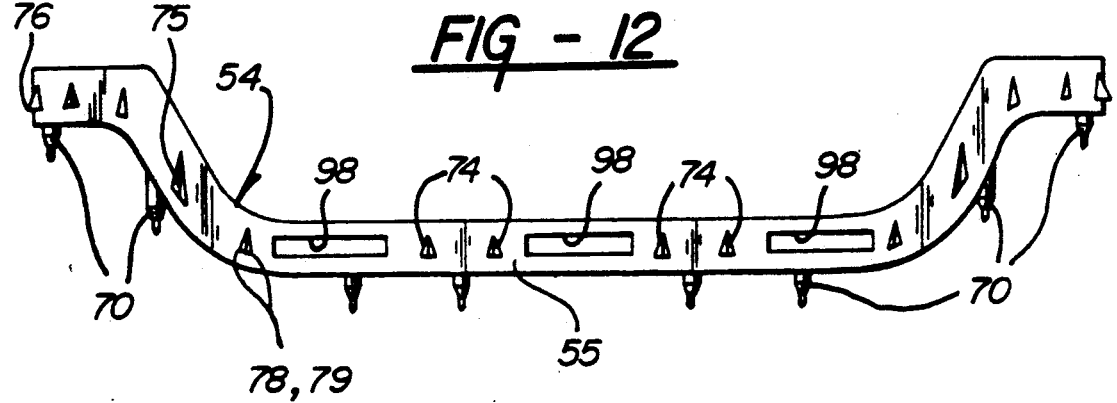
FIG. 12 is an end view of the upper retainer means.

Referring to the Figures wherein like numerals indicate like or corresponding parts throughout the several views, an armrest storage assembly is generally shown at 20 in FIG. 1. The armrest assembly 20 is generally mounted in association with a vehicle seat assembly as shown at 22. The seat assembly 22 generally includes a horizontal seat portion 24 and a generally vertical backrest portion 26. The armrest assembly 20 is generally mounted between two back portions 26 and pivotal between a generally horizontal position parallel with the seat portion 24 and a generally vertical position parallel with the back portions 26.

The armrest assembly 20 is generally of molded plastic material and includes a lower tray 28 defining a storage compartment therein and a top closure member 30 for covering the lower tray 28. A cover hinge means 32 is hingedly fastened between the top closure member 30 and the lower tray 28 to provide pivotal movement of the top member 30 relative to the lower tray 28 between a closed position covering the lower tray 28 and an open position opening the storage compartment.

The armrest 20 is mounted to the seat assembly 22 by support means 34. The support means 34 pivotally supports the lower tray 28 for providing pivotal rotation of the armrest 20 between a horizontal use position, generally parallel to the seat portion 24, and a vertical storage position, generally parallel to the back portions 26.

The lower tray 28 and top closure member 30 are generally referred to as substrates 28,30 and include a front wall 36, a back wall 38, a bottom surface 40, and side walls 42,44 extending upwardly from the bottom surface 40 to define an upper periphery about each substrate 28,30. The upper periphery about the substrates 28,30 forms a generally U-shaped channel 46 which will be described in further detail hereinbelow.

Generally, the armrest 20 comprises foam padding 48 and a sheet-like upholstery material cover 50 wrapped about the exterior of the substrates 28,30. The cover 50 includes an edge 52 which is displaced within the U-shaped channel 46. The padding 48 and covering 50 provide a cushioning to the exterior of the armrest 20 for prolonged use in support of the users forearm. The subject invention comprises an improved configuration for a retainer means 54 for retaining the material 50 within the U-shaped channel 46 of the respective substrates 28,30.

The U-shaped channel 46 of the substrates 28,30 comprises a bottom surface 56, and inside 58 and outside 60 channel walls spaced laterally apart and extending upwardly from the bottom surface 56. The bottom surface 56 comprises a plurality of apertures 57 spaced apart and extending therethrough as described further hereinbelow. The foam padding 48 and upholstery material 50 extend about the substrates 28,30 and the material 50 is wrapped around the outside wall 60 of the U-shaped channel 46 and includes an edge 52 lying on the bottom surface 56 of the channel 46, covering the plurality of apertures 57 adjacent the inside channel wall 58.

The retainer means 54 includes a U-shaped retaining element generally referred to as a retainer ring 54, although not circular, including an upper surface 62, lower surface 64, outside wall 66, and a laterally spaced inside wall 68 for disposition in the channel 46. The retainer ring 54 includes a front portion 55 for disposition in the portion of the channel 46 formed about the upper periphery of the substrate front wall 36 and further includes a pair of side arms 59,61 extending from the front portion 55 for disposition in the portion of the channel 46 formed about the upper periphery of the substrate side walls 42,44. The retainer ring 54 further includes a plurality of pins 70 extending downwardly from the lower surface 64 of the ring 54 and received by the plurality of apertures 57 in the bottom surface 56 of the U-shaped channel 46. The pins 70 include a base portion 71 and a tapered end portion 73 forming a pointed distal end. The pins 70 engage the material 50 directly adjacent the edge 52 of the upholstery material 50, piercing the material 50 as the pins 70 are extended through the apertures 57, thus restraining the material 50 within the channel 46.

The retainer means 54 includes gripping means 72 disposed on the outside wall 66 of the retainer ring 54 for gripping the material 50 adjacent the edge portion 52 and retaining the material 50 in the U-shaped channel 46 as the retainer ring 54 is forcibly inserted in the channel 46. The gripping means 72 comprise a plurality of triangular downwardly extending barbs 74 on the outside wall 66 of the retainer ring 54. The barbs 74 extend outwardly and downwardly along a ridge 75 to an apex 76 forming downwardly facing triangular surfaces 78,79. As shown in FIG. 6, the barbs 74 are grouped in adjacent pairs of three, spaced apart along the outer periphery of the outer wall 66 of the retainer ring 54 to create a plurality of gripping regions adjacent the edge 52 of the material 50 in the U-shaped channel 46.

The armrest storage assembly 20 is characterized by including coacting means 82,90 interlocking the inside wall 68 of the retainer means 54 and the inside wall 58 of the channel 46 and further spaced from the edge 52 of the material 50. The coacting means 82,90 locks the retainer means 54 into the channel 46 while the edge 52 remains spaced apart from the coacting means 82,90 to prevent interference therewith while the coacting means 82,90 locks the retainer means 54 in the channel 46. The coacting means 82,90 includes a plurality of hooks 82 extending outwardly from the inside wall 58 of the U-shaped channel 46. The hooks 82 include an inclined ramp surface 84 extending to a front locking wall 86 and a bottom locking surface 88 spaced above the bottom surface 56 of the U-shaped channel 46. The coacting means 82,90 further includes a recess 90 disposed longitudinally along the inside wall 68 of each side arm 59,61 of the retainer ring 54 as best shown in FIGS. 7 through 11. Each recess 90 includes a face surface 92, a lower locking surface 94 and an upper locking surface 96 spaced laterally above the lower surface 94. The coacting means 82,90 further includes a plurality of rectangular openings 98 in the front portion 55 of the U-shaped retainer ring 54 extending through the retainer ring 54 from the inside wall 68 to the outside wall 66.

Figure 9:
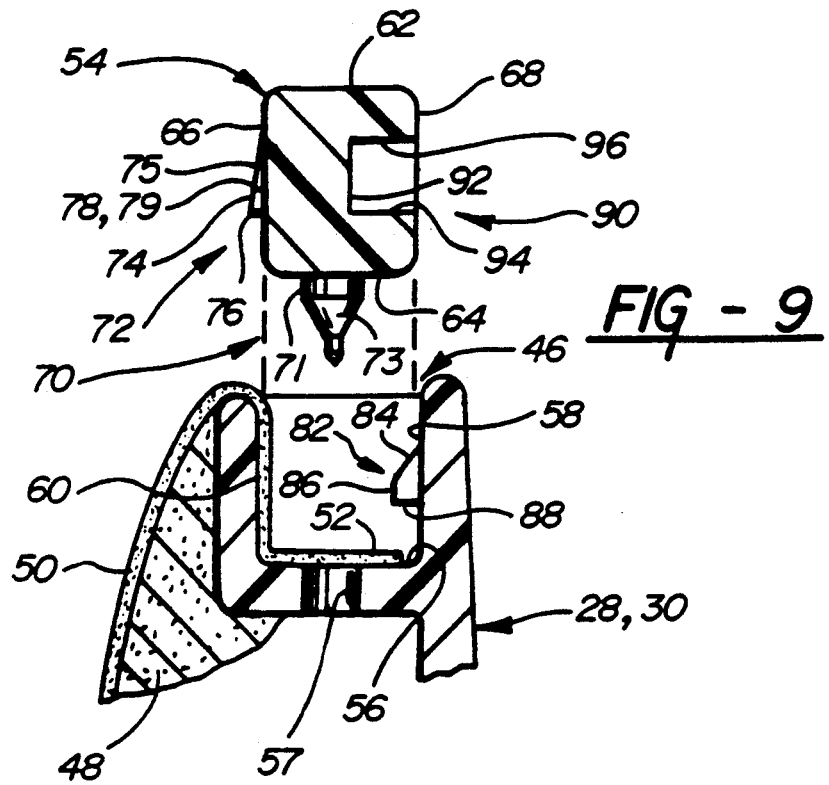
FIG. 9 is a fragmentary cross-sectional view of the channel and retainer means prior to engagement.
Figure 10:
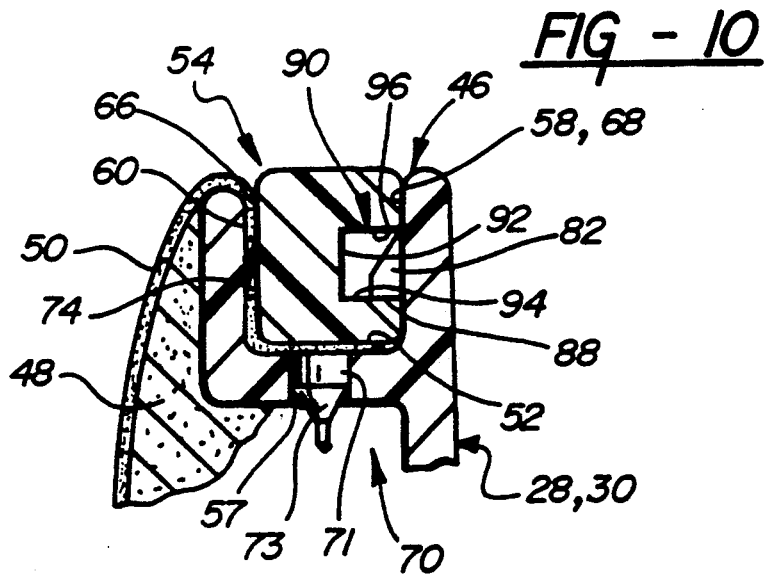
FIG. 10 is a fragmentary cross-sectional view of the channel and retainer means after engagement.
Figure 11:
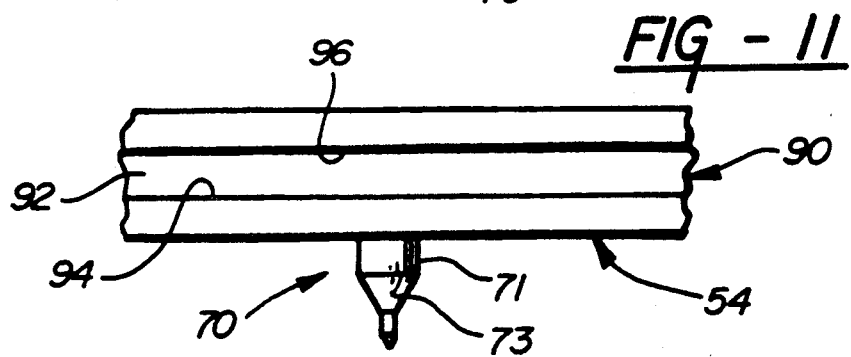
FIG. 11 is an enlarged side view of the retainer means showing a recess along the inside wall of the retainer means.

In operation, as shown in FIGS. 9 and 10, the upholstery material 50 is wrapped about the outside wall 60 of the U-shaped channel 46 formed about the upper periphery of each substrate 28,30. The edge 52 of the material 50 is positioned along the bottom surface 56 of the channel 46 covering the apertures 57. The U-shaped retainer ring 54 is positioned above the U-shaped channel 46 and forcibly inserted between the inside 58 and outside 60 walls of the channel 46. As shown, the pins 70 pierce the material 50 adjacent the edge 52 and extend through the apertures 57 in the bottom surface 56 of the U-shaped channel 46. The barbs 74, extending outwardly from the outside wall 66 of the retainer ring 54, grip the material 50 adjacent the edge 52, creating a downward force against the material 50 thus restraining the material 50 in the channel 46. The coacting means 82,90 interlocks the retainer ring 54 and the channel 46 by forcing the inside wall 68 of the retainer ring 54 to cam against the inclined surface 84 of the hooks 82 spaced about the inside wall 58 of the U-shaped channel 46. The retainer ring 54 may temporarily cause the walls 58,60 of the channel 46 to flex outwardly as the recess wall 68 cams against the hooks 82. The retainer ring 54 continues into the U-shaped channel 46 until the lower locking surface 94 of the recess 90 extends beyond the bottom surface 88 of the hook 82 and the hook 82 is received within the recess 90 between the lower 94 and upper 96 locking surfaces. The bottom surface 88 of the hook 82 abuts against the lower locking surface 94 of the recess 90 to interlockingly engage the retainer ring 54 and U-shaped channel 46. The coacting means 82,90 remains spaced from the edge 52 of the material 50 so as to prevent interference in the locking engagement between the hooks 82 and the recesses 90. The direct contact between the ring 54 and channel 46 provide a positive force fit locking engagement without interference from the material 50. The material 50 is retained in the channel 46 by the pins 70 and gripping barbs 74 independent of the locking of the ring 54 in the channel 46. Additionally, the hooks 82 along the front portion of the channel 46 are received in the openings 98 in the front portion 55 of the retainer ring 46 to further interlock the ring 54 and channel 46 and material 50 therebetween.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An armrest storage assembly (20) for a vehicle comprising:
    a substrate (28,30) having a U-shaped channel (46);
    a flexible sheet-like material cover (50) having an edge (52) disposed within said channel (46);
    retainer means (54) having an outside wall (66) and a laterally spaced parallel inside wall (68) disposed in said channel (46) for retaining said material (50) in said channel (46);
    gripping means (72) disposed along said outside wall (66) of said retainer means (54) for gripping said material (50) adjacent said edge (52) and retaining said material (50) in said U-shaped channel (46) as said retainer means (54) is forcibly inserted in said channel (46);
    and characterized by coacting means (82,90) disposed along said opposite spaced apart and parallel inside wall (68) and spaced apart from said material edge (52) for providing direct engagement between said inside wall (68) of said retainer means (54) and said U-shaped channel (46) for fixedly locking said retainer means (54) into said channel (46) while said edge (52) remains spaced apart from said coacting means (82,90) to prevent interference of said material (50) between said inside wall (68) of said retainer means 54) and said channel (46) while said coacting means (82,90) locks said retainer means (54) in said channel (46).

2. An assembly as set forth in claim 1 further characterized by said gripping means (72) comprising downwardly and outwardly pointed barbs (74) for gripping and maintaining the material (50) in said U-shaped channel (46) of said substrate (28,30).

3. An assembly as set forth in claim 2 further characterized by said channel (46) having an inside channel wall (58), an outside channel wall (60) and a bottom surface (56) extending continuously therealong.

4. An assembly as set forth in claim 3 further characterized by said coacting means (82,90) including a plurality of hooks (82) extending outwardly from said inside wall (58) of said U-shaped channel (46) and a recess (90) disposed along said inside wall (68) of said retainer means (54) for lockably receiving said hooks (82) and interlockingly securing said retainer means (54) to said substrate (28,30).

5. An assembly as set forth in claim 4 further characterized by said channel bottom surface (56) including a plurality of apertures (57) spaced therealong and said retainer means (54) including a plurality of pins (70) to align and extend through said apertures (57) while piercing and gripping said material (50) adjacent said edge (52).

6. An assembly as set forth in claim 5 further characterized by each of said barbs (74) generally triangular in shape and extending downwardly and outwardly along ridge (75) terminating at an apex (76) and forming a pair of downwardly facing triangular surfaces (78,79).

7. An assembly as set forth in claim 6 further characterized by each of said hooks (82) including a ramp surface (84) extending downwardly from said inside channel wall (60), a front wall (86) and a bottom surface (88) disposed below said ramp surface (84) and spaced above said bottom surface (56) of said channel (46).

8. An assembly as set forth in claim 7 further characterized by said substrate (28,30) comprising a bottom surface (40) and side walls (42,44) extending upwardly from said bottom surface (40) forming an upper periphery and defining said U-shaped channel (14).

9. An assembly as set forth in claim 8 further characterized by said substrate (28,30) comprising a lower tray (28) defining a storage compartment and a top closure member (30) covering said lower tray (28).

10. An assembly as set forth in claim 9 further characterized by said assembly (20) including cover hinge means (32) pivotally connecting said lower tray (28) and said top member (30) for providing pivotal movement of said top member (30) relative to said lower tray (28) between a closed position covering said lower tray (28) and an open position opening said storage compartment.

11. An assembly as set forth in claim 10 further characterized by including support means for pivotally connecting said armrest assembly (20) to a seat assembly and providing pivotal rotation of said armrest (20) between a horizontal use position and a vertical storage position.

* * * * *